US012577852B2

(12) United States Patent
Ferreira Da Silva et al.

(10) Patent No.: US 12,577,852 B2
(45) Date of Patent: Mar. 17, 2026

(54) METHOD FOR REMOVING SCALE FROM A SUBSEA MANIFOLD

(71) Applicant: PETROLEO BRASILEIRO S.A. - PETROBRAS, Rio de Janeiro (BR)

(72) Inventors: Mario Germino Ferreira Da Silva, Rio de Janeiro (BR); Francisca Ferreira Do Rosario, Rio de Janeiro (BR); Rosane Alves Fontes, Rio de Janeiro (BR); Katia Regina Silva Alves Da Rosa, Rio de Janeiro (BR); Valtair Marcos Cristante, Vitoria (BR); Tiago Cavalcante Freitas, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 836 days.

(21) Appl. No.: 17/642,585

(22) PCT Filed: Sep. 9, 2020

(86) PCT No.: PCT/BR2020/050359
§ 371 (c)(1),
(2) Date: Mar. 11, 2022

(87) PCT Pub. No.: WO2021/046625
PCT Pub. Date: Mar. 18, 2021

(65) Prior Publication Data

US 2022/0341291 A1 Oct. 27, 2022

(30) Foreign Application Priority Data

Sep. 13, 2019 (BR) .......................... 1020190190590

(51) Int. Cl.
*E21B 37/06* (2006.01)
*B08B 3/08* (2006.01)
(Continued)

(52) U.S. Cl.
CPC ................ *E21B 37/06* (2013.01); *B08B 3/08* (2013.01); *B08B 3/10* (2013.01); *B08B 9/0321* (2013.01);
(Continued)

(58) Field of Classification Search
None
See application file for complete search history.

(56) References Cited

U.S. PATENT DOCUMENTS

| | | | | |
|---|---|---|---|---|
| 5,059,333 | A | 10/1991 | Hen | |
| 9,091,460 | B2 * | 7/2015 | Parrella, Sr. ............ | F24T 10/30 |
| 2016/0369610 | A1 | 12/2016 | Wright et al. | |

FOREIGN PATENT DOCUMENTS

| | | | | |
|---|---|---|---|---|
| BR | 102015013833 | A2 | 3/2017 | |
| WO | WO-2010074912 | A2 * | 7/2010 | ............... E21B 7/06 |
| WO | 2017135941 | A1 | 8/2017 | |

OTHER PUBLICATIONS

BR102015013833 English translation, accessed on Dec. 2024. (Year: 2017).*

(Continued)

*Primary Examiner* — Kaj K Olsen
*Assistant Examiner* — Arlyn I Rivera-Cordero
(74) *Attorney, Agent, or Firm* — RAPHAEL BELLUM PLLC

(57) ABSTRACT

During meeting for planning operations for scale removal and scale inhibitor squeeze treatment in wells, the possibility of the manifold being partially incrusted with scale raised considering the more critical mixture of water produced. The proposed solution is a method of treatment for removing
(Continued)

scale from a manifold. Said method uses the geothermal heating of the exploration reservoir to heat a chemical removal solution (50). Heating is required to ensure the temperature is in a range that is also suitable for conducting the removal reaction, since the distance that the solution travels to the manifold (20) e the low temperature of the underwater environment make the reaction occur inefficiently, as in the case of pre-salt.

11 Claims, 7 Drawing Sheets

(51) Int. Cl.

| | |
|---|---|
| ***B08B 3/10*** | (2006.01) |
| ***B08B 9/032*** | (2006.01) |
| ***C09K 8/528*** | (2006.01) |

(52) U.S. Cl.
CPC ........ *C09K 8/528* (2013.01); *B08B 2203/007* (2013.01); *B08B 2209/032* (2013.01)

(56) References Cited

OTHER PUBLICATIONS

English Translation of International Search Report for PCT International Application No. PCT/BR2020/050359, dated Mar. 18, 2021, 6 Pages.

* cited by examiner

METHOD FOR REMOVING SCALE FROM A SUBSEA MANIFOLD

FIELD OF THE INVENTION

Chemical products based on amino carboxylic acids are employed as chelating agents for removing scale deposited in marine oil production systems. The most common types of scale are calcium carbonate ($CaCO_3$) and barium sulfate ($BaSO_4$). Mitigation of salt scale is a constant search of the world petroleum industry because as a function of this oil production losses and economic losses occur that influence the economics of petroleum field development projects. The use of chelants is important to maintain the production and integrity of the offshore oil production system, but for that proper positioning of the chemical and the appropriate temperature for the complexation reaction are required.

The formation of mineral scales in producing wells (ROCHA: AZEVEDO, 2007) and surface equipment is one of the major causes of increasing operating costs and reducing production in oil wells (Bezerra: Rosário: Rosa, 2013).

Salt scales result from changes in physicochemical properties (pH, temperature, pressure, etc.) of the produced fluids and/or the chemical incompatibility of water injected with the formation water present in the pores of the reservoir rock. However, prediction of such phenomenon is still a challenge due to the complexity of the precipitation kinetics.

The scales, accumulations of inorganic crystalline deposits, result from precipitation of salts present in the water from the reservoir or production system. Precipitation of these salts occurs when the solubility limit thereof is reached, caused primarily by the conditions of pH, pressure, temperature, or water composition change. Scale formation can involve (Mackay, et al. 2004):

Decreasing the pressure or increasing the temperature of the water, leading to the reduction of the solubility of the salt. The typical case is the reaction involving balancing the bicarbonate and calcium ions, from the carbon dioxide gas and the calcium carbonate solid.

$$Ca^{2+}+2HCO_{3-}=CaCO_3+CO_2+H_2O$$

Mixture of incompatible waters: the mixture of seawater and formation water leading to the precipitation of barium, strontium, and calcium sulfates.

$$Ba^{2+}+SO_4^{2-}=BaSO_4$$

$$Sr^{2+}+SO_4^{2-}=SrSO_4$$

$$Ca^{2+}+SO_4^{2-}=CaSO_4$$

Connate water+Sea water=Precipitation

Evaporation of salt solutions: causes reduction of solubility and can deposit chlorides.

$$NaCl_{(aq)}=NaCl_{(aq)}$$

In the case of offshore production fields, sea water is generally used to displace the oil and maintain the reservoir pressure. Thus, the occurrence of scale in these fields is quite common because of the incompatibility of the mixture of seawater with the formation water. Thus, when the injection of seawater into the reservoir is initiated, it mixes with the connate water (formation water). Since the waters have very distinct chemical compositions, it is possible to initiate scale as a function of supersaturation of sparingly soluble salts, generally barium and strontium sulfates.

The scales occur in the porous medium (reservoir), the reservoir/producing well interface, the production string and the surface facilities.

The reaction rate between incompatible chemical species in the injection and formation waters is the main parameter that determines the intensity of scale in cases where the reaction in the aqueous phase is far from balance. In the porous medium, this rate is highly affected by flow rate, diffusion/dispersion, and pore geometry. The mechanism of scale formation can be visualized in FIG. 1.

In the vicinity of producing wells, where the flow is more turbulent, the thermodynamic effects increase the scaling potential, in the case of heterogeneous reservoirs, in which the flow is from different layers. Thus, the regions near producing wells are most prone to the mixing of incompatible waters (Sobie; Mackay, 2000), in addition to being the convergence point of all circulating water inside the reservoir.

With respect to surface installations, however, direct mixing of incompatible waters finally occurs in production trains. This phenomenon is common when there is simultaneous production of wells producing waters with predominantly formation composition (containing, for example, high contents of barium) and wells that produce high contents of sea water. The scale in the plant generates efficiency loss from the process, directly causing increased load loss in the systems and thermal loss, thereby increasing energy expenditure for heating the fluids to be treated and the consumption of chemicals. Among alternatives to minimize this effect are well segregation when there is more than one production train, and the use of scale inhibitors injection into surface lines.

In literature (Collins, 2004) three distinct behaviors of barium sulfate precipitation have been proposed. The trend to scale can be correlated with the RS (saturation ratio) of the produced water. The RS can be defined as follows:

$$RS = \frac{a_{Ba^{2+}} a_{SO_4^{2-}}}{K_{ps}}$$

where:

$a_{Ba}^{2+}$ is the activity of barium ion:

$SO_4^{2-}$ is the activity of the sulfate ion;

$K_{pk}^{1}$ is the solubility product.

For high RS values there will be instantaneous precipitation at the mixing point, leading to the reduction of the saturation ratio with the production of large mass crystals that will form in the solution and deposit on the walls of the string in the base of the well.

For intermediate RS values there will be nucleation and precipitation in the string walls with rapid kinetics, resulting in smaller crystals and scale in the base of the string.

For low RS values the nucleation may be slowed down for a period of time, allowing fluids to move inside the string. With the reduction in pressure and temperature along the path, there will be an increase in RS, with consequent increase in the rates of nucleation and crystalline growth. However, with the temperature drop there will occur reduction of precipitation rate leading to scale near the surface.

As the water depth increases, the sea floor temperature gradually decreases and from depths from 700 meters deep it stabilizes at about 4° Celsius. The subsea equipment used for flowing the production of petroleum, such as a wet Christmas tree (ANM), production lines, manifolds, production risers are immersed in the seabed and thus being subject to these temperatures, the heat exchange of the equipment in the seabed leads to cooling of the produced fluids that are transported by such equipment.

As a function of the distance between the satellite wells and the stationary production unit, which can reach a few kilometers, a temperature reduction occurs leading to precipitation of components from fluids produced, such as paraffins, asphaltenes and the like inside the equipment of the production system.

As already described above, a precipitate that can occur inside the subsea production equipment is the scale of barium sulfate and strontium sulfate in sandy formations, calcium carbonate in carbonaceous formations. When there is the occurrence of salt scaling inside the manifold, loss of production may occur due to obstructions in the interior of the manifold.

The removal treatment is accomplished by pumping chelant solution that is positioned inside the fouled manifold where the complexation reactions of the cations present in the salts occur and thus the removal of the scale, thereby clearing the manifold. The efficiency of the complexation reaction depends on the temperature, the optimum temperature range is about 80° C. However, due to heat exchange with the seabed, where distances can reach about 8 kilometers, the treatment that is pumped undergoes a reduction in temperature due to heat exchange of the line or manifold with seawater in the sea bed reaching the manifold at a temperature much below the ideal for the complexation reaction.

DESCRIPTION OF PRIOR ART

Prior to the invention the scale removal treatment was to pump a chemical solution through the production lines and or lift gas to the manifold and left for a time inside the manifold seeking the removal of scale. However, in view of the problem of heat exchange with the seabed, the yield of the scale removal reaction had low efficiency as a function of the temperature with which it reaches the manifold.

Some results obtained until now with the remote operations (via the platform) for scale removal had as a consequence the increase in production in producing wells. The remote operation is normally initiated by the injection of a solvent pad (xylene), which helps to remove debris present in the vicinity of the formation, prevent formation of emulsions and the reversal of wettability of the rock.

Next, the scale scavenger is pumped from the production platform, through the same alternative pumps that are used for displacement of diesel oil or ethanol. The scavenger used is a formulation based on chelating agents, which is pumped past the riser, production lines, manifold, wet Christmas tree (ANM), production string, gravel until it reaches the formation. A hibernation period of the product in the formation is provided, during which, at certain times, the pumping of diesel oil to the well is accomplished in order to displace step by step the removal solution towards the formation, increasing the efficacy of its chemical reaction with the scale.

The descaling operations with rig are predicted from the time in that the remote operations do not have the desired effect. Similarly, to remote operation, a mixture of chelating agents is used, however, with the rig it is possible to perform the flushing of the product directly onto the parts most affected by the scale. In these interventions it is also possible the mechanical removal with bit from inside of the screens and the production string.

Thus, the intervention with rig can be divided into two steps: the first with the mechanical removal and the second with the chemical removal.

In the first step, a mechanical cleaning was performed with scraping and hydroblasting with flexpipe where it was found that there was a series of constraints in the production string below the PDG (bottom pressure measuring equipment). The constraints below the PDG, on the daily tracking, function as if it were loss of productivity index (IP), since they are based on readings of the PDG to calculate the flow pressure in the well.

The second step of the process is the chemical removal using a mixture of the descaling applied directly to the producing interval.

Studies have been performed to evaluate different polyaminated carboxylic acids, seeking to compare the efficiency of chelating or complexing agents, on technical and economic aspects (Lakatos: Szabó, 2005), with focus on comparing the results obtained with $BaSO_4$ and $SrSO_4$.

A well-known complexing agent is EDTA (Ethylenediamine tetra acetic acid) or ethylenediamine tetra-acetic acid is an organic compound that acts as a chelating agent, forming very stable complexes with various metal ions. Among them are magnesium and calcium, at pH values above 7 and manganese, iron (II), iron (III), zinc, cobalt, copper (II), lead and nickel at pH values below 7 (Holleman, Wiberg, 2001). The EDTA is an acid that acts as an hexadentate ligand, that is, it can complex the metal ion through six coordination positions, namely through four carboxylate anions (—COO—), after leaving of the 4H+ from the carboxylic groups, and also through the two N.

Metal EDTA complex has the following chemical structure:

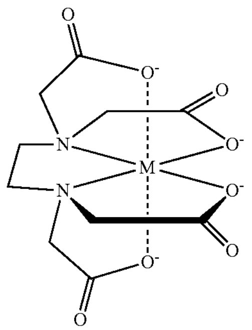

Diethylene triamine penta-acetic acid (DTPA) is an amino polycarboxylic acid consisting of a diethylenetriamine backbone with five carboxymethyl groups. The molecule can be viewed as an expanded version of EDTA and is used in a similar manner. It is a white, water-soluble solid.

The conjugated base of DTPA has a high affinity for metal cations. Thus, the penta-anion $DTPA^{5-}$ is potentially an octahedral ligand assuming that each center of nitrogen and each group COO— counts as a center for coordination. The formation constants for their complexes are about 100-fold higher than those for EDTA (Roger Hart, 2005). As a chelating agent, DTPA involves around a metal ion forming up to eight bonds. However, with transition metals, it forms a number of less than eight coordination bonds. Thus, after the formation of a complex with a metal, DTPA still has the ability to bind to other reagents. For example, in its copper (II) complex, the cation binds to DTPA in an hexadentate manner using the three amine centers and three of the five carboxylates.

literature discloses DTPA (Wang, The et al., 2002) Diethylidenetriaminepentaacetic acid, as the most efficient complexing agent for the dissolution of barium Sulfate (Lakatos: Szabó, 2005: Jordan, et al. 2012). FIG. 2 illustrates a dissolution test of barite in DTPA, EDTA, CDTA, and DOTA with 0.18 M at 40° C. in a system with stirring (Wang, et al., 2002).

The order of the performance of dissolution of barium sulphate by chelants is DTPA>DOTA>EDTA>CDTA according to the dissolution parameters set forth in Table 1:

| Agent | $k_{c(40° C.)}$ | $k_{c(60° C.)}$ | $k_{c(80° C.)}$ | $E_a$ | A | Log(A) |
|---|---|---|---|---|---|---|
| DTPA | 0.73 | 1.94 | 4.79 | 10.32 | $1.17 \times 10^7$ | 7 |
| DOTA | 0.63 | 1.78 | 3.41 | 8.87 | $1.10 \times 10^6$ | 6 |
| EDTA | 0.43 | 0.74 | 1.43 | 6.57 | $1.63 \times 10^4$ | 4 |
| CDTA | 0.11 | 0.17 | 0.23 | 4.27 | $7.61 \times 10^2$ | 2 |

The chelating agents have the following chemical structure:

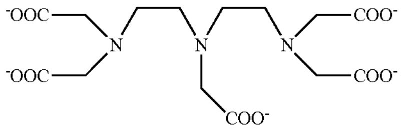

DTPA$^{5-}$

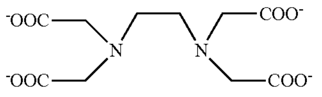

EDTA$^{4-}$

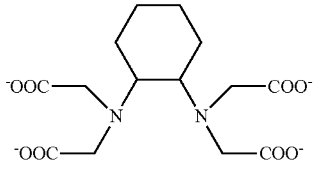

CDTA$^{4-}$

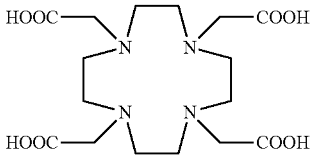

DOTA$^{4-}$

The $k_c$ is determined by the Arrhenius equation:

$$k_c = A \cdot e^{-E_a/R \cdot T}$$

where:

$k_c$ is the reaction constant ($hr^{-1}$);

A is the frequency factor ($hr^{-1}$);

$E_a$ is the activation energy (kcal/mol);

R is the universal constant of the gases (1.987 cal/mol·K);

T Is the temperature in Kelvin.

The appropriate temperature for the dissolution reaction kinetics is between 60° C. and 80° C. for application of the DTPA as a chelant for removal in offshore production systems it is a function of the temperature limit to ensure the integrity of the materials making up the production lines.

Document CA2916811A1 is a device capable of, by exchanging heat, using geothermal energy from a well for direct application in heating and cost reduction. Document U.S. Pat. No. 9,091,460B2 discloses a system capable of, by exchanging heat, using geothermal energy from a well for direct application in heating, conversion of thermal energy into mechanical and electricity generation. Document U.S. Pat. No. 9,157,666B2 discloses equipment and processes capable of, by exchanging heat, using geothermal energy of wells for direct application in heating/cooling and conversion of thermal energy into electricity generation.

Both documents cited as state of the art disclose methods, processes, or systems capable of, by heat exchanging, using geothermal energy from a well for various applications such as heating or cooling, conversion of thermal energy into mechanical or generation of electricity, but neither is capable of solving the problem of scale removal. In other words, none of the prior art documents are adapted to remove scale on the production line and manifold.

BRIEF DESCRIPTION OF THE INVENTION

During meetings for planning operations of scale removal and squeeze of scale inhibitor in wells, it was cited the possibility of the manifold being partially scaled considering the most critical mixing of the produced waters.

The proposed solution is a method for the treatment of scale removal in a manifold. This method utilizes geothermal heating of the exploration reservoir to heat a chemical removal solution. Heating is required to ensure that the temperature is in a range that can still perform the removal reaction since the distance the solution travels to the manifold and the low temperature of the submerged environment cause the reaction to occur non-efficiently, as is the case of the Pre-salt.

BRIEF DESCRIPTION OF THE DRAWINGS

The present invention will be described in more detail hereinafter with reference to the accompanying figures which, in a schematic and non-limiting form of the inventive scope, represent exemplary embodiments thereof. In the drawings, there is provided.

DETAILED DESCRIPTION OF THE INVENTION

Figure 1:
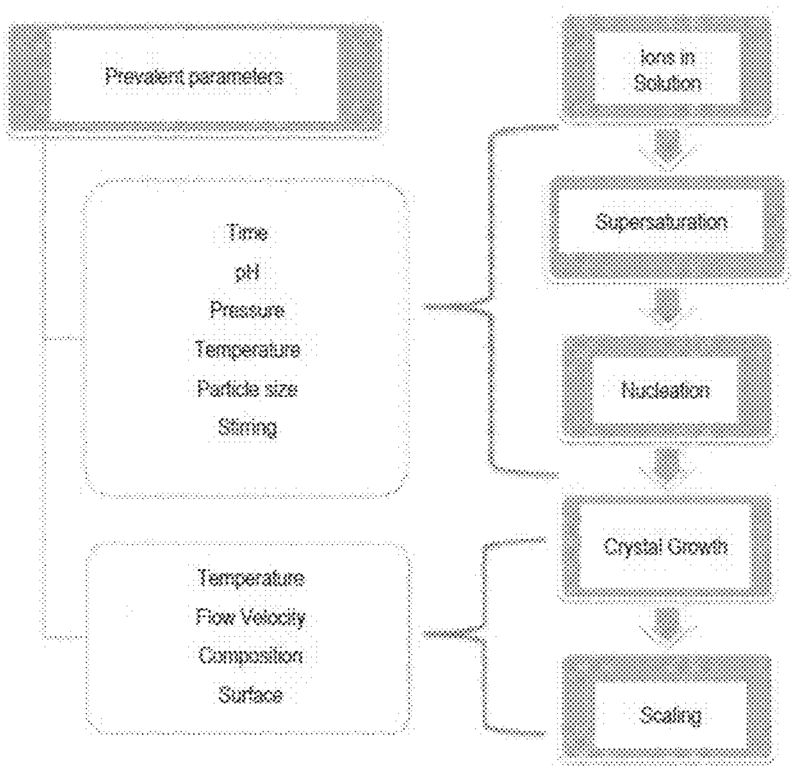
FIG. 1 illustrates the mechanism of scale forming.
Figure 2:
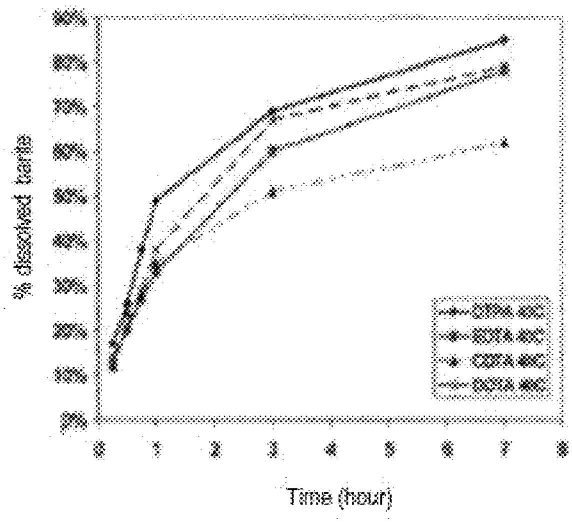
FIG. 2 illustrates a dissolution test of barite in DTPA, EDTA, CDTA, and DOTA with 0.18 M at 40° C. in a system with stirring.

In order to improve the efficiency of the reaction of the scale removal treatment in the manifold (20), therefore eliminating obstruction of the flow through pumping of the treatment with a suitable temperature for the efficiency of the complexation reaction. It has been devised for wells that have the occurrence of scale in the string, a procedure with the following sequence:

a removing scale from the production string (31);

b cleaning the production string (31) followed by pumping the entire treatment solution (pre-flush, scavenger solution and overflush) into the reservoir (40) for the treatment of scales;

c positioning the treatment solution in the reservoir (40) where a scale removal solution (50) will be injected into the reservoir (40);

d using geothermal heating of the reservoir (40) to heat the scale removal solution (50);

e after reaching stabilization and temperature balancing, performing the opening of the well (60) for production to ensure displacement of the removal solution (50) to the manifold (20), which is at a certain distance from the well (60), where its temperature will be around 62.5° C.;

f positioning the removal solution (50) inside the manifold (20).

Thus the removal solution may reach the manifold (20) at a temperature well near the ideal and thus promote the complexation reaction of the cations of the scale. Increasing the temperature alters the kinetics of the reaction that finally removes the scales in a more efficient manner, thus optimizing the treatment time as well as increasing the efficiency of the treatment. The innovation can generate time reduction of the treatment and the rig time, which improves the economy (net present value) and the production curve of the field, and therefore increases the productivity of the wells.

The entire treatment solution (Preflush, removal solution (50) and overflush) is injected directly into the well (60). The mixture takes place with the well fluids (60). However, Preflush is a pre-flush of the rock, acts by removing some of these fluids, allowing greater interaction with the removal solution (50) to ensure the effectiveness of the treatment. The overflush is a displacement solution.

For operation of pumping scale inhibitor, the pre-flush steps of the entire productive system (reservoir, column, riser and production lines) will be followed with organic solvent (generally a mixture of diesel, butylglycol and xylene) for cleaning the reservoir rock, treatment with the selected product and overflush 1 with diesel.

The adaptation consists of pumping after overflush 1, a second overflush that will be called overflush 2 (which corresponds to the volume equivalent to the sum of the volume of the string plus the volume of the line of the wet Christmas tree (ANM) (30) to the manifold (20), followed by pumping of the scale removal solution (50) to the manifold (20) that will be fully injected into the reservoir rock for geophysical hibernation.

After the completion of geothermal hibernation, when the temperature of the solution (50) for removing scale from manifold (20) is in equilibrium with the reservoir temperature (40), the other wells that produce to the manifold (20) will be closed, from this time one of the wells will be aligned to produce to the manifold (20) the volume equivalent to the scale scavenger plus overflush 2 plus the volume of manifold (20), in order to position the removal solution (50) inside the manifold (20) with a temperature around 62.5° C. and wait for the treatment solution to cool below 40° C. to complete the complexation reaction.

In order to maintain the operating conditions of manifold (20) (free of scaling) this operation can be repeated every time one is to perform the injection of scale inhibitor through some wells that produce through the same manifold (20).

Figure 3:
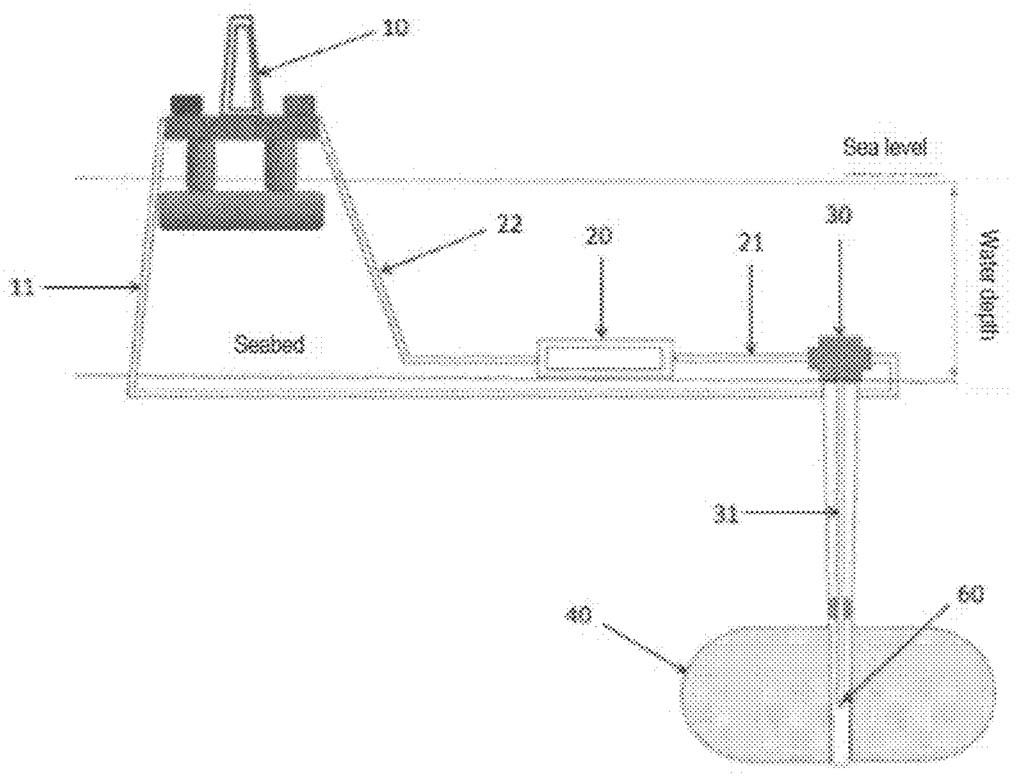
FIG. 3 illustrates the connection between UEP, manifold and the ANM of the well.

FIG. 3 shows, in a schematic way, a layout of UEP (10) connected to the manifold (20) through the production line, which in turn is connected to ANM (30) of oil well (60) through a production line and a connected gas line from UEP to ANM (30) of the well (60). The production of the well (60) passes through section 1 (21) of the line that goes from ANM (30) to manifold (20) and from manifold (20) by section 2 (22) from the production line to UEP (10). In a manifold (20) more than a well, sometimes, depending on the production development project, can reach up to 5 wells.

In the production system, the wells that produce to UEP (10), through the manifold (20) have scaling potential, the scale formation will occur first in the production string (31) inside the well (60), then in the production line section 1 (21) and then the occurrence will be in the manifold (20).

Figure 4:
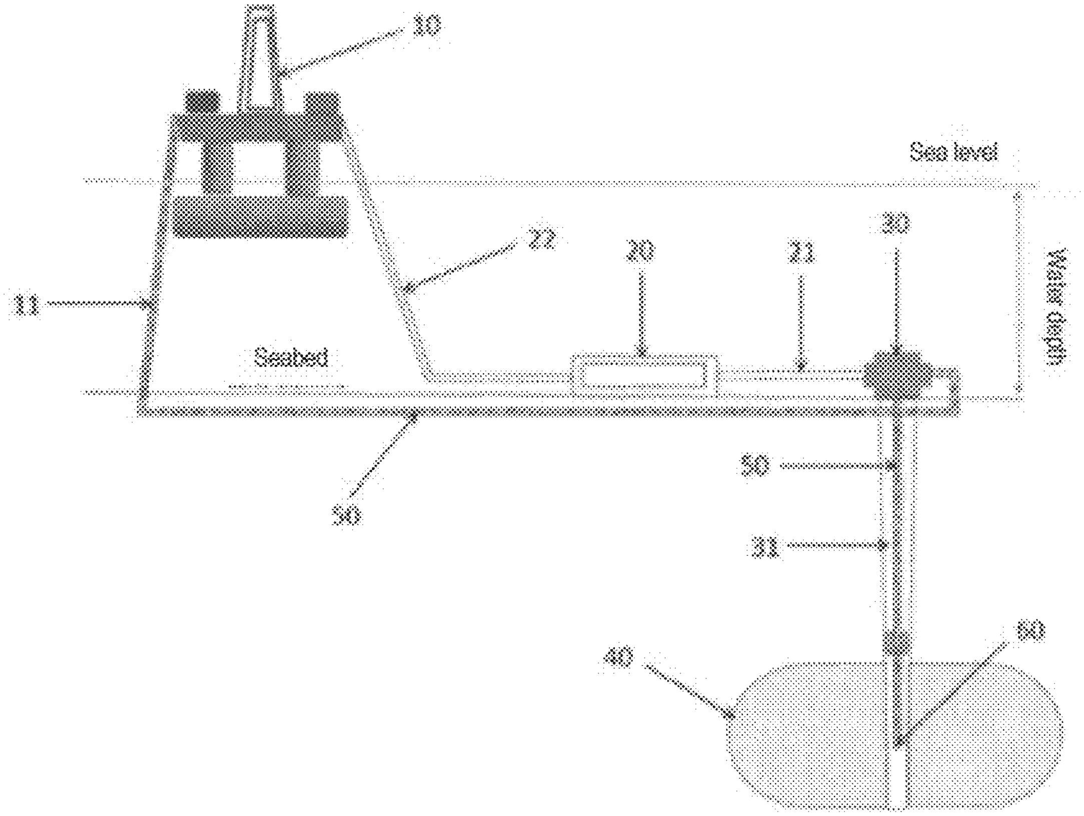
FIG. 4 illustrates the connection between UEP, manifold and the ANM of the well when scaling occurs in the production string.

FIG. 4 shows schematically, when scaling occurs in the string, the removal procedure is to pump the removal solution (chelants) (50) through the gas line (11) from UEP (10) to ANM (30) and from this to the production column (31) where the removal solution (50) is positioned for a period of up to 24 hours. After this period, the well (60) is aligned and opened to UEP (10) thus producing by the production line section 1 (21), manifold (20) and production line section 2 (22) to UEP (10).

Figure 5:
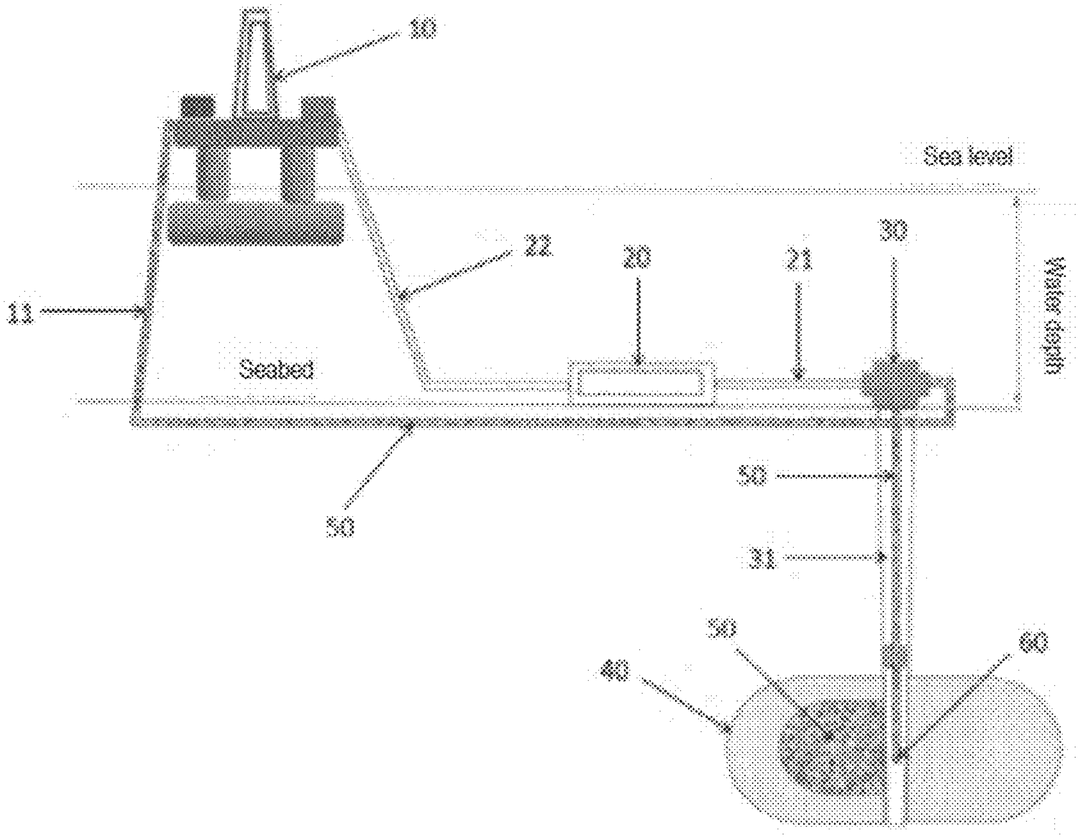
FIG. 5 illustrates the connection between UEP, manifold and the well when scaling occurs in the production string and or in the manifold.

FIG. 5 shows in a schematic way, when scaling occurs in the production string (31) and or in the production manifold (20), the removal procedure is to pump the removal solution (50) through the gas line (11) from UEP (10) to ANM (30), following to the production string (31) and reaching the reservoir (40) where the removal solution (50) is positioned for a sufficient period of time for geothermal heating the removal solution (50) (as a function of depth of well (60) inside the rock layers). After this period, well (60) is aligned and opened for UEP (10), thus producing by production section 1 (21), manifold (20) and production line section 2 (22) to UEP (10).

Figure 6:
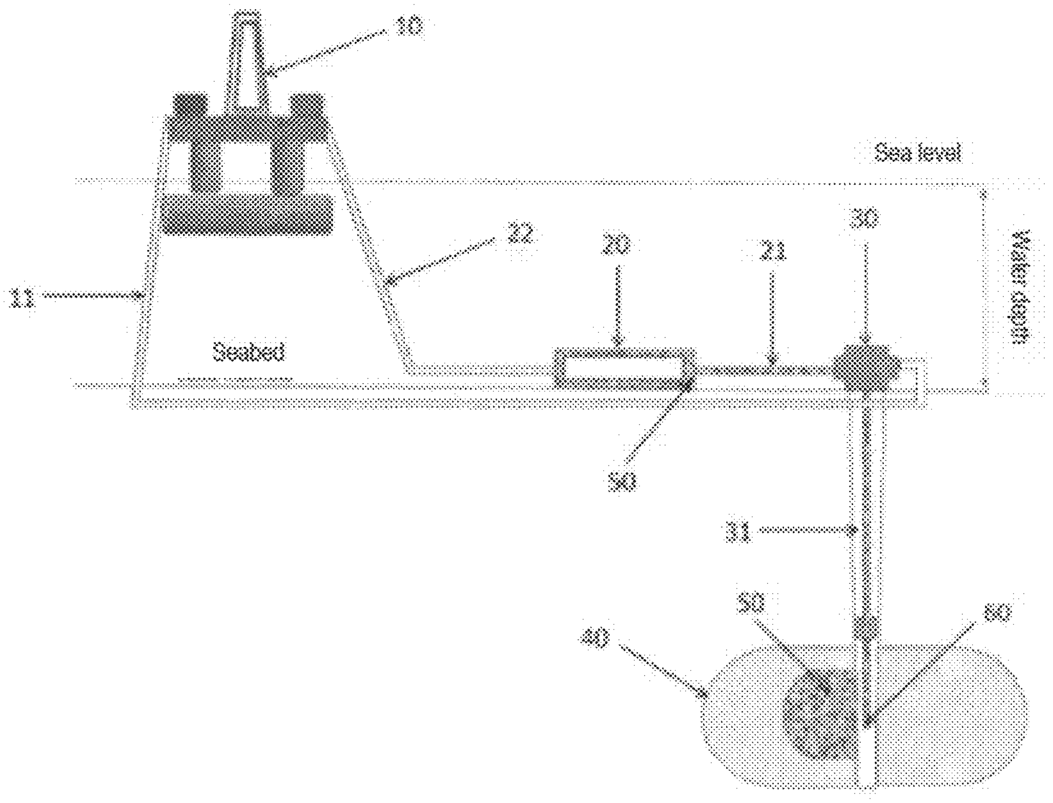
FIG. 6 illustrates the connection between UEP, manifold and the well for removing scaling from the interior of the production line and or manifold.

FIG. 6 shows in a schematic way the removal of scale from the inside of the production string (31) and or inside the production manifold (20). The removal procedure is to close the valve in the ANM (30) of the gas line (11) of the ANM itself (30), open the well (60) to produce the removal solution (50) that is in the reservoir (40) by the production string (31), which follows the production line section 1 (21) until filling the manifold (20). Then wait for the time required for the manifold temperature (20) to reach the stabilization value with the seabed temperature, displace a new volume of removal solution (50) into the manifold (20) and wait for stabilization with the seabed temperature, repeat this operation for two more times and or until the entire volume of removal solution (50) that is in the reservoir (40) is fully produced to the manifold (20).

Figure 7:
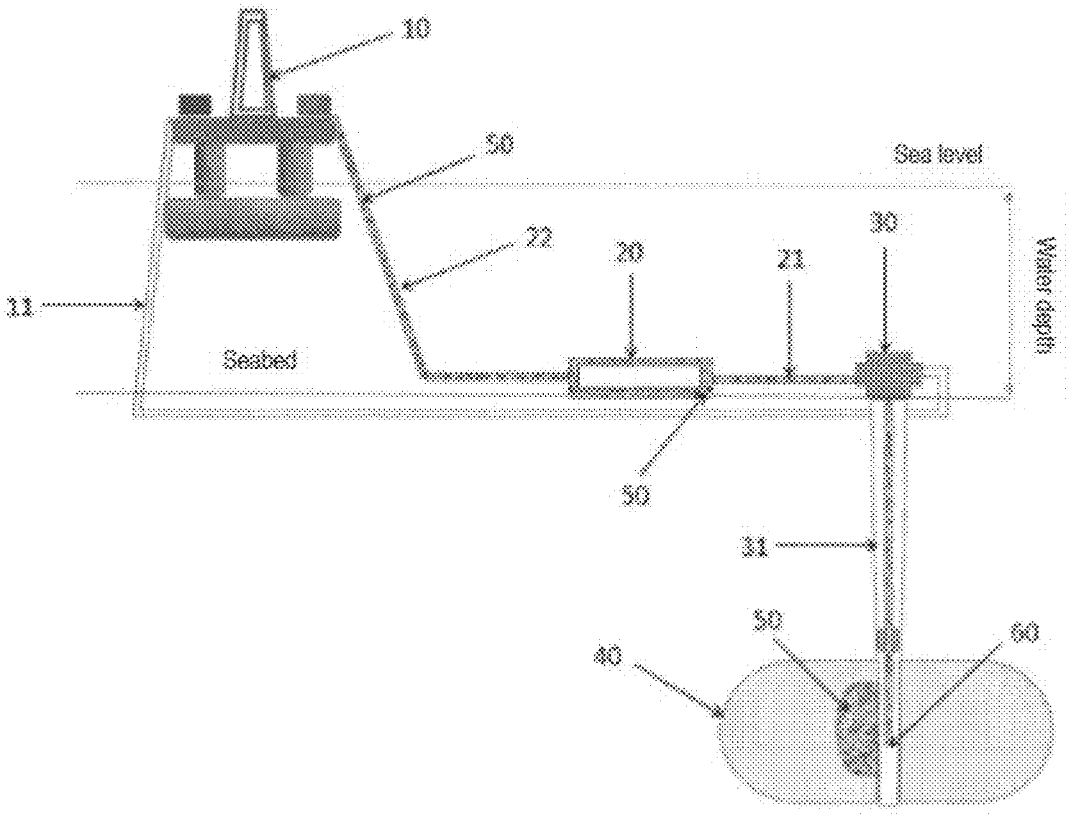
FIG. 7 illustrates the connection between UEP, manifold and the ANM of the well when the removal of scale is completed.

Finally, as can be seen in FIG. 7, after completing the step of scale removal in the manifold (20), the well (60) is aligned and opened to UEP (10), thus producing by the production line section 1 (21), manifold (20) and by the production line section 2 (22) to the UEP (10).

The Sizing of Treatments for Well Damage Removal CRT-24 was used. Which was prepared by CENPES/PDEP/TEE scale group on August 2007. The sizing was performed based on results obtained from tests of dissolution efficiency of barium sulfates and removal of damage caused by dissolution and reprecipitation of calcium and iron compounds in porous medium.

Data of Well Production:

| Data | Well CRT-24 |
|---|---|
| Water flow rate ($m^3$/d) | 545 - previous |
| Producing area (m) | 15.03 |

Sizing of Damage Removal Operation

Product Chelating Agents—Volume of Fluids/Pumping Flow Rate

| Pads | Volume (bbl) |
|---|---|
| Pre-flush (mixture of diesel and butylglycol) | 100 |
| Treatment (removal solution) | 300 |
| Overflush (displacement fluid being diesel or even aqueous fluid) | Displacement up to formation |
| Shut-in (h) (residence time of treatment solution in reservoir rock) | 5 |
| Pumping flow rate bbl/min | 2.66 |

Fluid Composition:

Pre-flush—Butylglycol and diesel

Treatment—BAD 40% MA

Overflush—Diesel

Sizing of Scale Damage Removal Operation:

Product Chelating Agent—Volume of Fluids/Pumping Flow Rate

| Pads | Volume (bbl) |
|---|---|
| Pre-flush | 100 |
| Treatment | 300 |
| Overflush | Displacement up to formation |
| Shut-in (h) | 12 |
| Q pumping bbl/min | 2.66 |

Fluid Composition:

Pre-flush—Butylglycol, diesel and xylene

Treatment—Chelating Agent—Trilon PP3—PH=8.0)

Overflush—Diesel

The invention claimed is:

1. A method for removing scale from a subsea manifold, comprising the following steps:

a. removing scale from a production string (31);

b. cleaning the production string (31) with a pumping of chelant and an overflush 1 in a well (60) for the treatment of scale, wherein just after the pumping of the overflush 1 there is a pumping of an overflush 2 to obtain a treatment solution, and wherein the overflush 2 is the volume equivalent to the sum of the volume of the production string (31) plus the volume of production line section 1 (21) of wet Christmas tree (30) up to a manifold (20);

C. positioning the treatment solution in a reservoir (40) wherein a scale removal solution (50) is injected into the reservoir (40), and wherein the scale removal solution (50) is present in the treatment solution;

d. heating the scale removal solution (50) using geothermal heating of the reservoir (40), wherein the scale removal solution (50) is in the reservoir (40) for 5 to 12 hours for geothermal hibernation;

e. displacing the scale removal solution (50) to the manifold (20) after reaching stabilization and balance of temperature; and f. positioning the scale removal solution (50) within the manifold (20).

2. The method according to claim 1, further comprising pumping a scale inhibitor to a pre-flush with organic solvent from the cleaning step of production string (31).

3. The method according to claim 1, wherein the overflush 1 and the overflush 2 are using diesel.

4. The method according to claim 1, further comprising pumping the scale removal solution (50) into the manifold (20).

5. The method according to claim 1, wherein the scale removal solution (50) is completely pumped into the reservoir (40) for geothermal hibernation.

6. The method according to claim 5, further comprising waiting for the scale removal solution (50) to reach equilibrium with the temperature of the reservoir (40).

7. The method according to claim 1, further comprising closing a valve in the wet Christmas tree (30) of a gas line (11) of the wet Christmas tree (30) itself, opening the well (60) to produce the scale removal solution (50) that is in the reservoir (40) by the production string (31) that continues through the segment of the production line section 1 (21) until filling the manifold (20).

8. The method according to claim 7, further comprising waiting for the temperature to drop to values less than 40° C. for the completion of a complexation reaction and repeating this operation twice more and/or until the entire volume of removal that is in the reservoir (40) is produced by the manifold (20).

9. The method according to claim 1, further comprising closing other wells that produce to the manifold (20).

10. The method according to claim 9, further comprising aligning one of the other wells to produce to the manifold (20) the equivalent volume of the scale removal solution (50) plus the overflush 2 plus the volume of the manifold (20), to position the scale removal solution (50) inside the manifold (20) at a temperature of 62.5° C.

11. The method according to claim 10, further comprising waiting for the temperature to drop to values less than 40° C. for the completion of a complexation reaction and repeating this operation twice more and/or until the entire volume of removal that is in the reservoir (40) is produced by the manifold (20).

* * * * *